United States Patent
Halalay et al.

(10) Patent No.: US 10,581,117 B2
(45) Date of Patent: Mar. 3, 2020

(54) IRON ION TRAPPING VAN DER WAALS GRIPPER ADDITIVES FOR ELECTROLYTE SYSTEMS IN LITHIUM-ION BATTERIES

(71) Applicant: GM Global Technology Operations LLC, Detroit, MI (US)

(72) Inventors: Ion C. Halalay, Grosse Pointe Park, MI (US); Timothy J. Fuller, Pittsford, NY (US); Bob R. Powell, Jr., Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 115 days.

(21) Appl. No.: 15/644,436

(22) Filed: Jul. 7, 2017

(65) Prior Publication Data

US 2019/0013548 A1    Jan. 10, 2019

(51) Int. Cl.
*H01M 10/0567*    (2010.01)
*H01M 10/0525*    (2010.01)
(Continued)

(52) U.S. Cl.
CPC ......... *H01M 10/0567* (2013.01); *H01M 4/38* (2013.01); *H01M 10/0525* (2013.01);
(Continued)

(58) Field of Classification Search
CPC ......... H01M 10/0525; H01M 10/0567; H01M 10/0568; H01M 10/0569; H01M 2300/0025; H01M 4/38
See application file for complete search history.

(56) References Cited

U.S. PATENT DOCUMENTS

| 4,530,963 A | 7/1985 | DeVoe et al. |
| 4,670,363 A | 6/1987 | Whitney et al. |

(Continued)

FOREIGN PATENT DOCUMENTS

| CN | 101803066 A | 8/2010 |
| CN | 102130361 A | 7/2011 |

(Continued)

OTHER PUBLICATIONS

Machine Translation JP2015037018A (Year: 2015).*
(Continued)

*Primary Examiner* — Stewart A Fraser
*Assistant Examiner* — Victoria H Lynch
(74) *Attorney, Agent, or Firm* — Harness, Dickey & Pierce, P.L.C.

(57) ABSTRACT

Electrochemical cells that cycle lithium ions and methods for suppressing or minimizing deposition of transition metal ions at negative electrodes are provided. The electrochemical cells include a positive electrode, a negative electrode, a separator disposed therebetween, and an electrolyte system including one or more lithium salts, one or more solvents, and at least one additive complexing compound. The at least one additive complexing compound includes an alkyl group having greater than or equal to 4 carbon atoms and less than or equal to 22 carbon atoms and a transition metal ion trapping group. The at least one additive compound associates with a surface of the separator via van der Waal's interactive forces and is further capable of complexing with transition metal ion within the electrochemical cell to sequester or tether the ions generated by contaminants to minimize or suppress the deposition of transition metal cations on the negative electrode.

20 Claims, 1 Drawing Sheet

(51) Int. Cl.
*H01M 10/0568* (2010.01)
*H01M 10/0569* (2010.01)
*H01M 4/38* (2006.01)
*H01M 2/16* (2006.01)

(52) U.S. Cl.
CPC ... *H01M 10/0568* (2013.01); *H01M 10/0569* (2013.01); *H01M 2/166* (2013.01); *H01M 2/1653* (2013.01); *H01M 2/1686* (2013.01); *H01M 2300/0025* (2013.01)

(56) References Cited

U.S. PATENT DOCUMENTS

| | | |
|---|---|---|
| 5,130,211 A | 7/1992 | Wilkinson et al. |
| 6,218,055 B1 | 4/2001 | Shah et al. |
| 6,689,513 B1 | 2/2004 | Morigaki et al. |
| 7,022,812 B2 | 4/2006 | Yoshimura et al. |
| 7,282,109 B2 | 10/2007 | Takata et al. |
| 8,349,031 B2 | 1/2013 | Take et al. |
| 8,455,140 B1 | 6/2013 | Huang et al. |
| 8,460,591 B2 | 6/2013 | Huang et al. |
| 8,460,829 B1 | 6/2013 | Huang et al. |
| 8,470,468 B2 | 6/2013 | Xiao et al. |
| 8,470,898 B2 | 6/2013 | Huang |
| 8,568,930 B2 | 10/2013 | Halalay et al. |
| 8,663,840 B2 | 3/2014 | Nazri et al. |
| 8,765,301 B2 | 7/2014 | Halalay et al. |
| 8,785,054 B2 | 7/2014 | Halalay et al. |
| 8,835,058 B2 | 9/2014 | Kia et al. |
| 8,951,654 B2 | 2/2015 | Sachdev et al. |
| 8,974,946 B2 | 3/2015 | Cai et al. |
| 8,993,646 B2 | 3/2015 | Huang |
| 8,999,584 B2 | 4/2015 | Jiang et al. |
| 9,023,520 B2 | 5/2015 | Halalay et al. |
| 9,028,565 B2 | 5/2015 | Huang |
| 9,077,038 B2 | 7/2015 | Halalay et al. |
| 9,093,705 B2 | 7/2015 | Xiao et al. |
| 9,123,939 B2 | 9/2015 | Xiao et al. |
| 9,130,231 B2 | 9/2015 | Halalay et al. |
| 9,138,932 B2 | 9/2015 | Huang |
| 9,142,830 B2 | 9/2015 | Xiao et al. |
| 9,153,819 B2 | 10/2015 | Huang et al. |
| 9,160,036 B2 | 10/2015 | Yang et al. |
| 9,172,075 B2 | 10/2015 | Kia et al. |
| 9,287,540 B2 | 3/2016 | Huang |
| 9,324,984 B2 | 4/2016 | Huang et al. |
| 9,331,323 B2 | 5/2016 | Huang |
| 9,346,066 B2 | 5/2016 | Huang |
| 9,350,046 B2 | 5/2016 | Huang |
| 9,362,542 B2 | 6/2016 | Halalay et al. |
| 9,362,551 B2 | 6/2016 | Sachdev et al. |
| 9,362,552 B2 | 6/2016 | Sohn et al. |
| 9,406,971 B2 | 8/2016 | Kia et al. |
| 9,412,986 B2 | 8/2016 | Huang |
| 9,455,430 B2 | 9/2016 | Huang et al. |
| 9,525,600 B1 | 12/2016 | Shen |
| 9,537,144 B2 | 1/2017 | Huang et al. |
| 9,742,028 B2 | 8/2017 | Zhou et al. |
| 9,799,916 B2 | 10/2017 | Halalay et al. |
| 9,865,854 B2 | 1/2018 | Fuller et al. |
| 10,008,749 B2 | 6/2018 | Luski et al. |
| 10,050,313 B2 | 8/2018 | Luski et al. |
| 10,243,241 B2 | 3/2019 | Halalay et al. |
| 2006/0194118 A1 | 8/2006 | Yew et al. |
| 2007/0238001 A1 | 10/2007 | Koyama |
| 2010/0143769 A1 | 6/2010 | Lee et al. |
| 2010/0239900 A1 | 9/2010 | Take et al. |
| 2011/0117413 A1 | 5/2011 | Wang et al. |
| 2011/0151333 A1 | 6/2011 | Halalay et al. |
| 2011/0165459 A1 | 7/2011 | Halalay et al. |
| 2011/0200863 A1 | 8/2011 | Xiao et al. |
| 2012/0007560 A1 | 1/2012 | Smart et al. |
| 2012/0102725 A1 | 5/2012 | Fuller et al. |
| 2012/0156568 A1 | 6/2012 | Kia et al. |
| 2012/0229096 A1 | 9/2012 | Nazri |
| 2012/0231321 A1 | 9/2012 | Huang et al. |
| 2012/0308872 A1 | 12/2012 | Huang |
| 2012/0309860 A1 | 12/2012 | Huang |
| 2012/0315384 A1 | 12/2012 | Abd Elhamid et al. |
| 2013/0004857 A1 | 1/2013 | Kia et al. |
| 2013/0052509 A1 | 2/2013 | Halalay et al. |
| 2013/0071742 A1 | 3/2013 | Halalay et al. |
| 2013/0115519 A1 | 5/2013 | Lee et al. |
| 2013/0130093 A1 | 5/2013 | Wang et al. |
| 2013/0131200 A1 | 5/2013 | Huang |
| 2013/0149588 A1 | 6/2013 | Garsuch et al. |
| 2013/0183582 A1 | 7/2013 | Halalay et al. |
| 2013/0284338 A1 | 10/2013 | Xiao et al. |
| 2013/0319599 A1 | 12/2013 | Huang |
| 2014/0220233 A1 | 8/2014 | Huang et al. |
| 2014/0242452 A1 | 8/2014 | Pieczonka et al. |
| 2014/0272526 A1 | 9/2014 | Huang |
| 2014/0272558 A1 | 9/2014 | Xiao et al. |
| 2015/0014890 A1 | 1/2015 | Xiao |
| 2015/0037651 A1 | 2/2015 | Huang |
| 2015/0056492 A1 | 2/2015 | Huang |
| 2015/0093626 A1 | 4/2015 | Fuller et al. |
| 2015/0093628 A1 | 4/2015 | Halalay et al. |
| 2015/0093639 A1 | 4/2015 | Halalay et al. |
| 2016/0104876 A1* | 4/2016 | Avison .............. C08J 5/22 429/50 |
| 2016/0111721 A1 | 4/2016 | Xiao et al. |
| 2016/0226109 A1 | 8/2016 | Angerbauer et al. |
| 2016/0344035 A1 | 11/2016 | Zhamu et al. |
| 2016/0372788 A1 | 12/2016 | Cheng et al. |
| 2016/0372789 A1 | 12/2016 | Cheng et al. |
| 2017/0155175 A1 | 6/2017 | Halalay et al. |
| 2017/0365882 A1 | 12/2017 | Luski et al. |
| 2017/0365883 A1 | 12/2017 | Luski et al. |
| 2018/0026307 A1 | 1/2018 | Jeon et al. |
| 2019/0013551 A1 | 1/2019 | Halalay et al. |
| 2019/0013552 A1 | 1/2019 | Wu et al. |

FOREIGN PATENT DOCUMENTS

| | | |
|---|---|---|
| CN | 102437371 A | 5/2012 |
| CN | 102447111 A | 5/2012 |
| CN | 102668171 A | 9/2012 |
| CN | 104518190 A | 4/2015 |
| CN | 104638215 A | 5/2015 |
| CN | 105161754 A | 12/2015 |
| CN | 105914401 A | 8/2016 |
| CN | 106816626 A | 6/2017 |
| CN | 107528085 A | 12/2017 |
| CN | 107528086 A | 12/2017 |
| CN | 109216634 A | 1/2019 |
| CN | 109216766 A | 1/2019 |
| DE | 102013218681 A1 | 3/2015 |
| DE | 102014113894 A1 | 4/2015 |
| DE | 102016122403 A1 | 6/2017 |
| DE | 10201711328 A1 | 12/2017 |
| DE | 102017113276 A1 | 12/2017 |
| DE | 102018116492 A1 | 1/2019 |
| DE | 102018116493 A1 | 1/2019 |
| EP | 1120850 A1 | 8/2001 |
| JP | S59031571 A | 2/1984 |
| JP | H07211351 A | 8/1995 |
| JP | 2015037018 A * | 2/2015 ........ H01M 10/0525 |
| WO | 2016104895 A1 | 6/2016 |
| WO | WO-2017120884 A1 | 7/2017 |

OTHER PUBLICATIONS

Scientific and Technical Information Center (STIC) search results from Sam Darwish, Oct. 15, 2018 (Year: 2018).*

First Office Action for Chinese Patent Application No. 201410642253.9 dated May 24, 2016 with English language machine translation, 15 pages.

First Office Action for Chinese Patent Application No. 201611028544.4 dated Oct. 17, 2018 with correspondence from China Patent Agent H.K. Ltd dated Oct. 19, 2018 summarizing contents, 9 pages.

Plichta et al. "A low-temperature electrolyte for lithium and lithium-ion batteries," Journal of Power Sources, 88 (200), pp. 192-196.

(56) References Cited

OTHER PUBLICATIONS

Wikipedia contributors. "Ionophore." Wikipedia, The Free Encyclopedia. Wikipedia, The Free Encyclopedia, Aug. 30, 2012. Web. Mar. 20, 2018. (Year: 2012).
Wikipedia contributors. "Siderophore." Wikipedia, The Free Encyclopedia. Wikipedia, The Free Encyclopedia, Aug. 16, 2012. Web. Mar. 20, 2018. (Year: 2012).
Banerjee, et al.; "Review—Multifunctional Materials for Enhanced Li-Ion Batteries Durability: A Brief Review of Practical Options"; Journal of the Electrochemical Society, 164 (1); Jan. 5, 2017; pp. A6315-A6323.
Ziv, et al. "Manganese Sequestration and Li-Ion Batteries Durability Enhancement by Polymeric 18-Crown-6 Ethers"; Journal of the Electrochemical Society, 161 (9); May 21, 2014; pp. A1213-1217.
Walkowiak, et al., Macrocycle Carriers for Separation of Metal Ions in Liquid Membrane Process—A Review, Desalination 240, 1999, pp. 186-197.
Komaba, et al., Inorganic Electrolyte Additives to Suppress the Degradation of Graphite Anodes by Dissolved Mn(II) for Lithium-Ion Batteries, Journal of Power Sources 119-121, 2003, pp. 378-382.
Shahrisa, et al., CHemistry of Pyrones, Part 3: New Podands of 4H-Pyran-4-ones; 5 Molecules, 2000, pp. 200-207.
Bruening, et al., Understanding Cation-Macrocycle Binding Selectivity in Single-Solvent Extractions, and Liquid Membrane Systems by Quantifying Thermodynamic Interations; Cation Binding by Macrocycles, Chapter 2, 1990, pp. 112-113, Marcel DekkerInc., New York and Basel.
Kaifer, et al., Redox Control of Cation Binding in Macrocyclic Systems; Cation Binding by Macrocycles, 1990, Chapert 8, p. 364, Marcel Dekker Inc., New York and Basel.
Atwood, et al., Cation Complexation by Calizarenes; Cation Binding by Macrocycles, 1990, Chapter 15, pp. 581-582, 587; Marcel Dekker Inc., New York and Basel.
Toner, et al., Modern Aspects of Host-Guest Chemistry: Molecular Modeling and Conformationally Restricted Hosts; Crown Ethers and Analogs, 1989, Chapter 3, pp. 81-83, John Wiley and Sons, New York.
Vogtle, et al., Crown-ether-complexes and Selectivity; Crown Ethers and Analogs, 1989, Chapter 4, pp. 208-215, John Wiley and Sons, New York.
Weber, E., New Developments in Crown Ether Chemistry: Lariats, Spherands, and Second-Sphere Complexes; Crown Ethers and Analogs, 1989, Chapter 5, pp. 306-307, 309, 314-315, 320-321, John Wiley and Sons, New York.
Arora, et al., Battery Separators, Chem. Rev. 104, 2004, pp. 4419-4462.

"Teijin Develops More Heat-Resistant Li-Ion Battery Separator", Trading Markets.Com, Sep. 10, 2009, 3 pages, http://www.tradingmarkets.com.
Plastics Today Staff, "TonenGeneral and Toray team up to create lithium-ion battery separator films", plasticstoday.com, Nov. 4, 2009, 2 pages, http://www.plasticstoday.com.
Montanari, F., et al., "Hydroxymethyl Derivatives of 18-Crown-6 and [2.2.2] Cryptand: Versatile Intermediates for the Synthesis of Lipophilic and Polymer-Bonded Macrocyclic Ligands," J. Org. Chem, 1982, 47, 1298-1302.
Babb, D. A., "Synthesis and Metal Ion Complexation of Synthetic Ionophores," A Ph.D. Dissertation in Chemistry, Texas Tech University, Dec. 1985, 149 pages.
Manecke, G., et al., "Polymere Kryptanden, 1", Makromol. Chem. 182, 1973-1984, (1981).
Kopolow, S., et al., "Polyvinyl macrocyclic polyethers). Synthesis and Cation Binding Properties", vol. 6, No. 1, Jan.-Feb. 1973, pp. 133-142.
Smid, J., et al., "Synthesis of 4'-Vinylbenzocrown Ethers", Organic Preparations and Procedures Int. 8(4), 1976, pp. 193-196.
Banerjee, et al.; "Increasing the durability of Li-ion batteries by means of manganese ion trapping materials with nitrogen functionalities"; Journal of Power Sources 341 (2017); pp. 457-465.
Banerjee, et al.; "Multifunctional Manganese Ions Trapping and Hydrofluoric Acid Scavenging Separator for Lithium Ion Batteries Based on Poly (ethylene-alternate-maleic acid) Dilithium Salt"; Advanced Energy Materials; 2016; 9 pages.
Halalay et al.; U.S. Appl. No. 15/644,422, filed Jul. 7, 2017 entitled "Polymeric Ion Traps for Suppressing or Minimizing Transition Metal Ions and Dendrite Formation or Growth in Lithium-Ion Batteries"; 43 pages.
Luski et al.; U.S. Appl. No. 15/186,526, filed Jun. 19, 2016 entitled "Lithium Ion Battery"; 74 pages.
Luski et al.; U.S. Appl. No. 15/186,525, filed Jun. 19, 2016 entitled "Lithium Ion Battery"; 65 pages.
Wu et al.; U.S. Appl. No. 15/644,444, filed Jul. 7, 2017 entitled "Electrolyte System Suppressing or Minimizing Metal Contaminants and Dendrite Formation in Lithium Ion Batteries"; 45 pages.
First Office Action for Chinese Patent Application No. 201710434173.8 dated Feb. 22, 2019 with English language machine translation, 28 pages.
First Office Action for Chinese Patent Application No. 201710434249.7 dated Feb. 22, 2019 with English language machine translation, 21 pages.
Butler, Alison et al., "Iron(III)—siderophore coordination chemistry: Reactivity of marine siderophores," Coord Chem Rev. 2010, 254 (3-4), pp. 288-296 (Feb. 1, 2010); doi:10.1016/j.ccr.2009.09.010.

\* cited by examiner

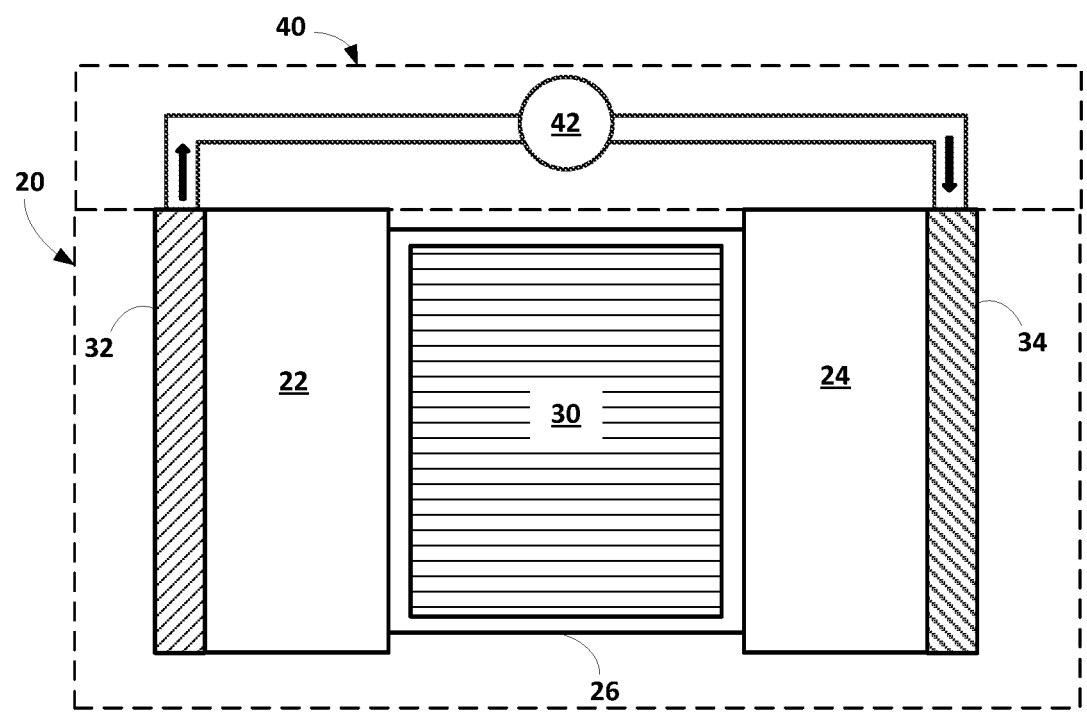

IRON ION TRAPPING VAN DER WAALS GRIPPER ADDITIVES FOR ELECTROLYTE SYSTEMS IN LITHIUM-ION BATTERIES

INTRODUCTION

This section provides background information related to the present disclosure which is not necessarily prior art.

The present disclosure relates to additives for an electrolyte system that includes an additive that associates with a separator via van der Waals interactive forces in a lithium-ion battery having a transition metal contaminant, like iron ions. The presence of the additive minimizes or suppresses the deposition of movement of metal ions generated by contaminants on the negative electrode of an electrochemical cell and improves performance thereof.

By way of background, high-energy density, electrochemical cells, such as lithium-ion batteries can be used in a variety of consumer products and vehicles, such as Hybrid Electric Vehicles (HEVs) and Electric Vehicles (EVs). Typical lithium-ion batteries comprise a first electrode, a second electrode, an electrolyte material, and a separator. One electrode serves as a positive electrode or cathode and another serves as a negative electrode or anode. A stack of lithium-ion battery cells may be electrically connected to increase overall output. Conventional rechargeable lithium-ion batteries operate by reversibly passing lithium ions back and forth between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery.

Many different materials may be used to create components for a lithium-ion battery. The electrolyte typically contains one or more lithium salts, which may be dissolved and ionized in one or more non-aqueous solvents. The negative electrode generally includes a lithium insertion material or an alloy host material. Typical electroactive materials for forming an anode include lithium-graphite intercalation compounds, lithium-silicon compounds, lithium-tin alloys, lithium alloys and lithium titanate $Li_{4+x}Ti_5O_{12}$, where $0 \leq x \leq 3$, such as $Li_4Ti_5O_{12}$ (LTO). The positive electrode generally includes an electroactive material which can be intercalated or alloyed with lithium ions, which may comprise one or more transition metals, such as manganese, nickel, cobalt, chromium, iron, vanadium, and combinations thereof. Such active materials may include, by way of non-limiting example, lithium-transition metal oxides or mixed oxides of the spinel type, for example including spinel lithium manganese oxide ($LiMn_2O_4$ referred to as LMO), $LiCoO_2$, $LiNiO_2$, $LiMn_{1.5}Ni_{0.5}O_4$, $LiNi_{(1-x-y)}Co_xM_yO_2$ (where $0<x<1$, $0<y<1$, and M may be Al, Mn, or the like), or lithium iron phosphates.

LMO-graphite cells often suffer from significant capacity fading. Several mechanisms have been proposed to date as explanations for the significant capacity fading experienced by LMO-graphite cells, also known as the manganese dissolution-migration-deposition-catalytic reactions (DMDCR). Furthermore, the DMDCR mechanism can also occur with other TM ions (e.g., Fe, Ni, Co). The DMDCR sequence of events potentially leads to a large capacity loss in LMO-graphite cells, through potential loss of electrochemically active $Li^+$ ions, potential damage to the structure of the electrodes (thus irreversible capacity loss through destruction of the active materials) and potential malignant SEI growth (thus capacity loss through under-utilization of the electrodes due to steadily increasing interfacial resistances). Therefore preventing any one or more of the various steps of the DMDCR loop from occurring can lead to significant improvements in the long-term performance and capacity retention in lithium-ion batteries, especially those with $LiPF_6$ based electrolyte solutions. Accordingly, it would be desirable to develop materials for use in high energy lithium-ion batteries that reduce the consequences of transition metal dissolution and deposition, such as reactions related to DMDCR and potential dendrite formation.

SUMMARY

This section provides a general summary of the disclosure, and is not a comprehensive disclosure of its full scope or all of its features.

In various aspects, the present disclosure provides an exemplary electrochemical cell having improved capacity retention that cycles lithium ions. The electrochemical cell may include a positive electrode, a negative electrode, a microporous separator, and an electrolyte system. The positive electrode may include a positive lithium-based electroactive material. The negative electrode may include a negative electroactive material. The microporous separator may be disposed between the positive and negative electrodes. The electrolyte system may include at least one lithium salt, at least one solvent, and at least one additive compound. The lithium salt and the at least one additive compound may be soluble in the at least one solvent. The at least one additive compound may include an alkyl group and a transition metal ion trapping group. The alkyl group may have greater than or equal to 4 carbon atoms to less than or equal to 22 carbon atoms. The transition metal ion trapping group may be selected from the group consisting of: crown ethers, azacrown ethers, thiacrown ethers, siderophores, alkali metal salts of bidentate organic acids, alkali metal salts of ethylene diamine tetraacetic acid, and combinations thereof. The electrolyte system may contact the microporous separator and the at least one additive compound may associate with a surface of the microporous separator via van der Waal's interactive forces. The at least one additive compound may complex with a transition metal cation, which may be present in the electrochemical cell, to minimize or suppress deposition of transition metal cations on the negative electrode. The transition metal cation may be selected from the group consisting of: iron (Fe), manganese (Mn), cobalt (Co), nickel (Ni), chromium (Cr), and combinations thereof.

In one variation, the electrolyte system may include greater than or equal to about 0.01 weight % to less than or equal to about 5 weight % of the at least one additive compound.

In one variation, the at least one lithium salt may be selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis-(oxalate)borate ($LiB(C_2O_4)_2$) (LiBOB); lithium hexafluoroarsenate ($LiAsF_6$); lithium trifluoromethanesulfonate ($LiCF_3SO_3$); bis(trifluoromethanesulfonimide) ($LiN(CF_3SO_2)_2$); lithium bis(fluorosulfonylimide) ($LiN(FSO_2)_2$); and combinations thereof.

In one variation, the at least one solvent may be selected from the group consisting of: cyclic carbonates, linear carbonates, aliphatic carboxylic esters, γ-lactones, chain structure ethers, cyclic ethers, and combinations thereof.

In one variation, the at least one additive compound may have a structure represented by one of R—X or R—X—R, where R represents the alkyl group having greater than or equal to 4 carbon atoms to less than or equal to 22 carbon atoms and X represents the transition metal ion trapping group.

In one variation, the alkyl group may be selected from the group consisting of: butyl, pentyl, hexyl, heptyl, octyl, nonyl, decyl, undecyl, dodecyl, tridecyl, pentadecyl, hexadecyl, octadecyl, eicosanyl, and docosanyl.

In one variation, the transition metal ion trapping group may include at least one siderophore. The siderophore may be selected from the group consisting of: a catecholate comprising a phenolate $C_6H_5(OH)$-group, a hydroxamate comprising a N(OH)C(=O)C-group, a carboxylate comprising a $H_3C(OH)C(=O)$-group, and a mixed ligand. The hydroxamate siderophores may be selected from the group consisting of: ferrichrome, desferrioxamine, desferrioxamine B, desferrioxamine E, fusarinine C, ornibactin, rhodotorulic acid, and combinations thereof. The catecholate siderophores may be selected from the group consisting of: enterobactin, bacillibactin, vibriobactin, and combinations thereof. The carboxylate siderophores may be derivatives of citric acid. The mixed ligands siderophores may be selected from the group consisting of: azotobactin, pyoverdine, and combinations thereof.

In one variation, the transition metal ion trapping group may include a bactin siderophore. The bactin siderophore may be selected from the group consisting of: ferrichrome, desferriozamine, desferrioxamine B, desferrioxamine E, fusarinine C, ornibactin, rhodotorulic acid, enterobactin, bacillibactin, bicriobactin, azotobactin, pyoverdine, agrobactin, aerobactin, yersiniabactin, salmochelin, rhizobactin, vibriobactin, azotobactin, pyoverdine, and combinations thereof.

In one variation, the transition metal ion trapping group may be selected from the group consisting of: 1,7-dialkyl-diaza-12-crown-4,1,4,10-trioxa-7,10-dialkyl-7,10-diazacyclopentadecane, 1,4,10,13-tetraoxa-7,16-dialkyl-7,16-diazacyclooctadecane, dialkyl-7,16-dibenzyl-1,4,10,13-tetra-7,16-diazacyclooctadecane, 3,11-dialkyl-3,11-diaza-1,5,9,13-tetrathiacyclohexadecane, 3,11,19-trialkyl-3,11,19-triaza-1,5,9,13,17,21-hexathiacyclotetracosane, 1,4,7-trialkyl-1,4,7-triazacyclononane, 1,5,9-trialkyl-1,5,9-triazacyclododecane, tetraalkylcyclen, 1,4,8,11-tetraalkyl-1,4,8,11-tetraazacyclotetradecane, 1,4,7,10,13,16-hexaalkyl-1,4,7,10,13,16-hexaazacyclootadecane, poly(N-alkylethyleneimine), dialkyldibenzo-18-crown-6,N,N'-dialkyl-dibenzyl-1,4,10,13-tetraoxa-7,16-diazacyclooctadecane, 5,6,13,14-dibenzo-hexaoxa-1,10-diazabicyclo-(8,8,8)hexacosane, and combinations thereof.

In other aspects, the present disclosure provides another exemplary electrochemical cell having improved capacity that cycles lithium ions. The electrochemical cell may include a positive electrode, a negative electrode, a microporous separator, and an electrolyte system. The positive electrode may include a positive lithium-based electroactive material. The negative electrode may include a negative electroactive material. The microporous separator may be disposed between the positive and negative electrodes and may include a ceramic material having pore diameters greater than or equal to 5 nm and less than or equal to 200 nm. The electrolyte system may include at least one lithium salt, at least one solvent, and at least one non-polymeric additive compound, which may be soluble in the at least one solvent. The at least one non-polymeric additive compound may include an alkyl group and an iron cation trapping group. The alkyl group may have greater than or equal to 4 carbon atoms to less than or equal to 22 carbon atoms. The iron cation trapping group may be selected from the group consisting of: crown ethers, azacrown ethers, thiacrown ethers, siderophores, alkali metal salts of bidentate organic acids, alkali metal salts of ethylene diamine tetraacetic acid, and combinations thereof. The electrolyte system may make contact with the microporous separator and the at least one non-polymeric additive compound may associate with a surface of the microporous separator via van der Waal's interactive forces. The at least one additive compound may complex with iron cations, which may be present in the electrochemical cell, to minimize or suppress deposition of transition metal cations on the negative electrode.

In one variation, the electrolyte system may include greater than or equal to about 0.01 weight % to less than or equal to 5 weight % of the at least non-polymeric additive compound.

In one variation, the lithium salt may be selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis-(oxalate)borate ($LiB(C_2O_4)_2$) (LiBOB); lithium hexafluoroarsenate ($LiAsF_6$); lithium trifluoromethanesulfonate ($LiCF_3SO_3$); bis(trifluoromethanesulfonimide) ($LiN(CF_3SO_2)_2$); lithium bis(fluorosulfonylimide) ($LiN(FSO_2)_2$); and combinations thereof.

In one variation, the at least one solvent may be selected from the group consisting of: cyclic carbonates, linear carbonates, aliphatic carboxylic esters, γ-lactones, chain structure ethers, cyclic ethers, and combinations thereof.

In one variation, the at least one non-polymeric additive compound may have a structure represented by one of R—X or R—X—R, where R is the alkyl group having greater than or equal to 4 carbon atoms and less than or equal to 22 carbon atoms and X is the iron cation trapping group. The alkyl group may be selected from the group consisting of: butyl, pentyl, hexyl, heptyl, octyl, nonyl, decyl, undecyl, dodecyl, tridecyl, pentadecyl, hexadecyl, octadecyl, eicosanyl, and docosanyl. The X may be a siderophore. The siderophore may be selected from the group consisting of: a catecholate comprising a phenolate $C_6H_5(OH)$-group, a hydroxamate comprising a N(OH)C(=O)C-group, a carboxylate comprising a $H_3C(OH)C(=O)$-group, and a mixed ligand.

In one variation, the iron cation trapping group includes a bactin siderophore. The bactin siderophore may be selected from the group consisting of: ferrichrome, desferriozamine, desferrioxamine B, desferrioxamine E, fusarinine C, ornibactin, rhodotorulic acid, enterobactin, bacillibactin, bicriobactin, azotobactin, pyoverdine, agrobactin, aerobactin, yersiniabactin, salmochelin, rhizobactin, vibriobactin, azotobactin, pyoverdine, and combinations thereof.

In one variation, the iron cation trapping group may be selected from the group consisting of: 1,7-dialkyldiaza-12-crown-4,1,4,10-trioxa-7,10-dialkyl-7,10-diazacyclopentadecane, 1,4,10,13-tetraoxa-7,16-dialkyl-7,16-diazacyclooctadecane, dialkyl-7,16-dibenzyl-1,4,10,13-tetra-7,16-diazacyclooctadecane, 3,11-dialkyl-3,11-diaza-1,5,9,13-tetrathiacyclohexadecane, 3,11,19-trialkyl-3,11,19-triaza-1,5,9,13,17,21-hexathiacyclotetracosane, 1,4,7-trialkyl-1,4,7-triazacyclononane, 1,5,9-trialkyl-1,5,9-triazacyclododecane, tetraalkylcyclen, 1,4,8,11-tetraalkyl-1, 4,8,11-tetraazacyclotetradecane, 1,4,7,10,13,16-hexaalkyl-1,4,7,10,13,16-hexaazacyclootadecane, poly(N-alkylethyleneimine), dialkyldibenzo-18-crown-6, N,N'-dialkyl-dibenzyl-1,4,10,13-tetraoxa-7,16-diazacyclooctadecane, 5,6,13,14-dibenzo-hexaoxa-1,10-diazabicyclo-(8,8,8)hexacosane, and combinations thereof.

In other aspects, the present disclosure provides a method of suppressing or minimizing the consequences of transition metal dissolution and improving cycling performance and capacity retention in a lithium-ion electrochemical cell that cycles lithium ions. The method may include introducing an electrolyte system into the electrochemical cell. The electrochemical cell may include a negative electrode and a microporous separator. The electrolyte system may include at least one lithium salt, at least one solvent, and at least one additive compound. The at least one additive compound may be soluble in the at least one solvent. The at least one additive compound may include an alkyl group and a transition metal ion trapping group. The alkyl group may have greater than or equal to 4 carbon atoms and less than or equal to 22 carbon atoms. The transition metal ion trapping group may be selected from the group consisting of: crown ethers, azacrown ethers, thiacrown ethers, siderophores, alkali metal salts of bidentate organic acids, alkali metal salts of ethylene diamine tetraacetic acid, and combinations thereof. After introducing the electrolyte system, the at least one additive compound of the electrolyte system may bind to a surface of the microporous separator by van der Waal's forces. The at least one additive compound may be capable of complexing with a transition metal ion within the electrochemical cell. The transition metal ion may be selected from the group consisting of: iron (Fe), manganese (Mn), cobalt (Co), nickel (Ni), chromium (Cr), and combinations thereof. The method thus minimizes or suppresses the deposition of transition metal ions on the negative electrode.

In one variation, the electrolyte system may include greater than or equal to about 0.01 weight % to less than or equal to about 5 weight % of the at least one additive compound.

In one variation, the at least one lithium salt may be selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis-(oxalate)borate ($LiB(C_2O_4)_2$) (LiBOB); lithium hexafluoroarsenate ($LiAsF_6$); lithium trifluoromethanesulfonate ($LiCF_3SO_3$); bis(trifluoromethanesulfonimide) ($LiN(CF_3SO_2)_2$); lithium bis(fluorosulfonylimide) ($LiN(FSO_2)_2$); and combinations thereof.

In one variation, the at least one solvent may be selected from the group consisting of: cyclic carbonates, linear carbonates, aliphatic carboxylic esters, γ-lactones, chain structure ethers, cyclic ethers, and combinations thereof.

In one variation, the at least one additive compound may have a structure represented by one of R—X or R—X—R, where R is the alkyl group having greater than or equal to 4 carbon atoms and less than or equal to 22 carbon atoms and X is the iron cation trapping group. The alkyl group may be selected from the group consisting of: butyl, pentyl, hexyl, heptyl, octyl, nonyl, decyl, undecyl, dodecyl, tridecyl, pentadecyl, hexadecyl, octadecyl, eicosanyl, and docosanyl. The X may be a siderophore. The siderophore may be selected the group consisting of: a catecholate comprising a phenolate $C_6H_5(OH)$-group, a hydroxamate comprising a N(OH)C(=O)C-group, a carboxylate comprising a $H_3C$(OH)C(=O)-group, and a mixed ligand.

In one variation, the transition metal ion trapping group may include a bactin siderophore. The bactin siderophore may be selected from the group consisting of: ferrichrome, desferriozamine, desferrioxamine B, desferrioxamine E, fusarinine C, ornibactin, rhodotorulic acid, enterobactin, bacillibactin, bicriobactin, azotobactin, pyoverdine, agrobactin, aerobactin, yersiniabactin, salmochelin, rhizobactin, vibriobactin, azotobactin, pyoverdine, and combinations thereof.

In one variation, the transition metal ion trapping group may be selected from the group consisting of: 1,7-dialkyl-diaza-12-crown-4,1,4,10-trioxa-7,10-dialkyl-7,10-diazacyclopentadecane, 1,4,10,13-tetraoxa-7,16-dialkyl-7,16-diazacyclooctadecane, dialkyl-7,16-dibenzyl-1,4,10,13-tetra-7,16-diazacyclooctadecane, 3,11-dialkyl-3,11-diaza-1,5,9,13-tetrathiacyclohexadecane, 3,11,19-trialkyl-3,11,19-triaza-1,5,9,13,17,21-hexathiacyclotetracosane, 1,4,7-trialkyl-1,4,7-triazacyclononane, 1,5,9-trialkyl-1,5,9-triazacyclododecane, tetraalkylcyclen, 1,4,8,11-tetraalkyl-1,4,8,11-tetraazacyclotetradecane, 1,4,7,10,13,16-hexaalkyl-1,4,7,10,13,16-hexaazacyclootadecane, poly(N-alkylethyleneimine), dialkyldibenzo-18-crown-6, N,N'-dialkyl-dibenzyl-1,4,10,13-tetraoxa-7,16-diazacyclooctadecane, 5,6,13,14-dibenzo-hexaoxa-1,10-diazabicyclo-(8,8,8)hexacosane, and combinations thereof.

Further areas of applicability will become apparent from the description provided herein. The description and specific examples in this summary are intended for purposes of illustration only and are not intended to limit the scope of the present disclosure.

DRAWING

The drawing described herein is for illustrative purposes only of selected embodiments and not all possible implementations, and is not intended to limit the scope of the present disclosure.

FIG. 1 is a schematic of an exemplary electrochemical battery cell including an electrolyte system having at least one additive compound in accordance with certain aspects of the present disclosure.

Corresponding reference numerals indicate corresponding parts throughout the drawing.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the FIGURE. Spatially or temporally relative terms may be intended to encompass different orientations of the device or system in use or operation in addition to the orientation depicted in the FIGURE.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.01%.

In addition, disclosure of ranges includes disclosure of all values and further divided ranges within the entire range, including endpoints and sub-ranges given for the ranges.

The disclosure of all patents, patent applications, articles, and literature referenced or cited in this disclosure are hereby incorporated by reference herein.

Example embodiments will now be described more fully with reference to the accompanying drawing.

The present technology pertains to improved electrochemical cells, especially lithium-ion batteries, which may be used in vehicle applications. However, the present technology may also be used in other electrochemical devices, especially those that include lithium ions.

An exemplary and schematic illustration of a lithium-ion battery 20 is shown in FIG. 1. Lithium-ion battery 20 includes a negative electrode 22, a positive electrode 24, and a porous separator 26 (e.g., a microporous or nanoporous polymeric separator) disposed between the two electrodes 22, 24. The porous separator 26 includes an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34).

The porous separator 26 operates as both an electrical insulator and a mechanical support, by being sandwiched between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to form intercalated or alloyed lithium at the positive electrode 24. The electric current passing through the external circuit 18 can be harnessed and directed through the load device 42 until the intercalated lithium in the negative electrode 22 is depleted and the capacity of the lithium-ion battery 20 is diminished.

The lithium-ion battery 20 can be charged or re-energized at any time by connecting an external power source to the lithium-ion battery 20 to reverse the electrochemical reactions that occur during battery discharge. The connection of an external power source to the lithium-ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, an AC wall outlet and a motor vehicle alternator. In many lithium-ion battery configurations, each of the negative current collector 32, negative electrode 22, the separator 26, positive electrode 24, and positive current collector 34 are prepared as relatively thin layers (for example, from several microns to a millimeter or less in thickness) and assembled in layers connected in electrical parallel arrangement to provide a suitable electrical energy and power package.

Furthermore, the lithium-ion battery 20 can include a variety of other components that while not depicted here are nonetheless known to those of skill in the art. For instance, the lithium-ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and hand-held consumer electronic devices, for example, are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and power if it is required by the load device 42.

Accordingly, the lithium-ion battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

With renewed reference to FIG. 1, the porous separator 26 may include, in instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

When the porous separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26.

The microporous polymer separator 26 may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (such as polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, and/or combinations thereof.

The polyolefin layer, and any other optional polymer layers, may further be included in the microporous polymer separator 26 as a fibrous layer to help provide the microporous polymer separator 26 with appropriate structural and porosity characteristics. Thus, the nanoporous or microporous membrane 30 may contain a single layer or a multi-layer laminate fabricated from either a dry or wet process, by solvent casting, by a non-woven fiber laying process, or by any other process for making a nanoporous or microporous membrane 30 with properties suitable for application in Li-ion batteries. For example, in one example, a single layer of the polyolefin may constitute the entirety of the separator membrane 30. In another example, a single layer of one or a combination of any of the polymers from which the separator 26 may be formed (e.g., the polyolefin and/or one or more of the other polymers listed above for the separator 26) may constitute the entirety of the separator 26.

As another example, however, multiple discrete layers of similar or dissimilar polyolefins and/or polymers for the separator 26 may be assembled together. In one example, a discrete layer of one or more of the polymers may be coated on a discrete layer of the polyolefin for the separator 26. Further, the polyolefin (and/or other polymer) layer, and any other optional polymer layers, may further be included in the separator 26 as a fibrous layer to help provide the separator 26 with appropriate structural and porosity characteristics. A more complete discussion of single and multi-layer lithium-ion battery separators, and the dry and wet processes that may be used to make them, can be found in P. Arora and Z. Zhang, "Battery Separators," *Chem. Rev.*, 104, 4424-4427 (2004).

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

In various aspects, the negative electrode 22 includes an electroactive material as a lithium host material capable of functioning as a negative terminal of a lithium-ion battery. The negative electrode 22 may thus include the electroactive lithium host material and optionally another electrically conductive material, as well as one or more polymeric binder materials to structurally hold the lithium host material together. For example, in one embodiment, the negative electrode 22 may include an active material including graphite, silicon (Si), tin (Sn), or other negative electrode particles intermingled with a binder material selected from the group consisting of: polyvinylidene difluoride (PVdF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate, and combinations thereof, by way of non-limiting example. Suitable additional electrically conductive materials may include carbon-based material or a conductive polymer. Carbon-based materials may include by way of non-limiting example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used.

Graphite is often used to form the negative electrode 22 because it exhibits advantageous lithium intercalation and deintercalation characteristics, is relatively non-reactive in the electrochemical cell environment, and can store lithium in quantities that provide a relatively high energy density. Commercial forms of graphite and other graphene materials that may be used to fabricate the negative electrode 22 are available from, by way of non-limiting example, Timcal Graphite and Carbon of Bodio, Switzerland, Lonza Group of Basel, Switzerland, or Superior Graphite of Chicago, United States of America. Other materials can also be used to form the negative electrode 22, including, for example, lithium-silicon and silicon containing binary and ternary alloys and/or tin-containing alloys, such as Si—Sn, SiSnFe, SiSnAl, SiFeCo, $SnO_2$, and the like. In certain alternative embodiments, lithium-titanium anode materials are contemplated, such as $Li_{4+x}Ti_5O_{12}$, where $0 \leq x \leq 3$, including lithium titanate ($Li_4Ti_5O_{12}$) (LTO).

The present technology is particularly suitable for use with negative electrode materials for the negative electrode 22 that includes graphite materials. Such graphite materials may of course be combined with other electroactive materials. The principles of the present teachings may likewise be advantageous for use with other negative electrode materials, such as those containing silicon or tin, in certain alternative variations. The negative electrode current collector 32 may be formed from copper or any other appropriate electrically conductive material known to those of skill in the art.

The positive electrode 24 may be formed from a lithium-based active material that can sufficiently undergo lithium intercalation and deintercalation or alloying and dealloying, while functioning as the positive terminal of the lithium-ion battery 20. The positive electrode 24 may include a polymeric binder material to structurally fortify the lithium-based active material. The positive electrode 24 electroactive materials may include one or more transition metals, such as manganese (Mn), nickel (Ni), cobalt (Co), chromium (Cr), iron (Fe), vanadium (V), and combinations thereof.

Two exemplary common classes of known electroactive materials that can be used to form the positive electrode 24 are lithium transition metal oxides with layered structure and lithium transition metal oxides with spinel phase. For example, in certain instances, the positive electrode 24 may include a spinel-type transition metal oxide, like lithium manganese oxide ($Li_{(1+x)}Mn_{(2-x)}O_4$), where x is typically less than 0.15, including $LiMn_2O_4$ (LMO) and lithium manganese nickel oxide $LiMn_{1.5}Ni_{0.5}O_4$ (LMNO). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such lithium manganese oxide ($Li_{(1+x)}Mn_{(2-x)}O_4$), a mixed lithium manganese nickel oxide ($LiMn_{(2-x)}Ni_xO_4$), where $0 \leq x \leq 1$, and/or a lithium manganese nickel cobalt oxide (e.g., $LiMn_{1/3}Ni_{1/3}Co_{1/3}O_2$).

Such active materials may be intermingled with an optional electrically conductive material and at least one polymeric binder, for example, by slurry casting active materials and optional conductive materials with such binders, like polyvinylidene difluoride (PVdF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate. Electrically conductive materials may include graphite, carbon-based materials, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The positive current collector 34 may be formed from aluminum or any other appropriate electrically conductive material known to those of skill in the art.

Each of the separator 26, the negative electrode 22, and the positive electrode 24 may include an electrolyte system 30, capable of conducting lithium ions between the negative electrode 22 and the positive electrode 24. The electrolyte system 30 may be a non-aqueous liquid electrolyte solution including a lithium salt and at least one additive compound dissolved in an organic solvent or a mixture of organic solvents.

In a variety of instances, the lithium-ion battery 20 may include transition metal contaminants (e.g., manganese (Mn), iron (Fe), chromium (Cr), nickel (Ni) and in certain circumstances, copper (Cu), tin (Sn), zinc (Zn)). In certain instances, contaminants may include transition metals disassociating from the electroactive material of the positive electrode 24 (e.g., transition metals leaching out of positive LMO, LNMO, or HENMC electrodes). The transition metal ions (e.g., cations) may migrate to the negative electrode 22, leading to the "poisoning" of the negative electrode 22, which results in accelerated capacity fading, and thus loss of durability in the electrochemical cell 20.

By way of example, several causes have been proposed to date as explanations for the significant capacity fading experienced in LMO-graphite cells in particular: (a) thermal and potential-driven decomposition (reduction at graphite, oxidation at LMO electrodes) of the $LiPF_6$ electrolyte solution components ($PF_6^-$— anion and organic carbonate solvents), leading to loss of $Li^+$ ions, generation of gases, acid species production, and polymerization-inducing species; (b) net loss of Mn ions, and oxygen from the LMO crystal lattice, together with the associated loss of electrochemically active $Li^+$ ions due to dissolution of Mn cations through acid attack; (c) migration to and deposition at negative electrodes of the dissolved Mn ions, followed by solid-electrolyte interface (SEI) damage, impairment of the electrode structure (including graphite exfoliation, through gas generation) and excessive SEI growth due to reactions catalyzed by Mn; (d) loss of electrochemically active $Li^+$ ions due to their substitution by protons during acid attack on LMO; (e) loss of $Li^+$ ions through parasitic reactions at graphite electrodes; (f) irreversible Jahn-Teller phase transition from cubic to tetragonal in LMO at low states of charge (below 2.8 V vs. $Li/Li^+$), leading to the growth of an electrochemically inactive phase.

Mechanisms (a)-(e) are related and form a feedback loop of self-reinforcing degradation reactions, because some of the reactions from category (a), namely generation of acid species, are a prerequisite for (b) and (d), while (e) is a consequence of (c). Thus the prerequisites for, and the consequences of the Mn dissolution-migration-deposition-catalytic reactions (DMDCR) sequence of events lead to a large capacity loss in LMO-graphite cells, through loss of electrochemically active $Li^+$ ions, damage to the structure of the electrodes (thus irreversible capacity loss through destruction of the active materials) and malignant SEI growth (thus capacity loss through under-utilization of the electrodes due to steadily increasing interfacial resistances).

Therefore minimizing or preventing any one or preferably several of the (a)-(e) steps of the DMDCR loop from occurring can lead to significant improvements in the long-term performance and capacity retention in LIBs with $LiPF_6$ based electrolyte solutions. Furthermore, the DMDCR mechanism can also occur with other TM ions (e.g., Fe, Ni, Co). Further, lithium titanate electrodes are also affected by acid attack and the consequences of TM (e.g., titanium) dissolution. The detrimental effects caused by the DMDCR mechanism are most pronounced for Mn-containing materials with spinel phases and in cells with graphitic carbon.

In other aspects, the metal contaminants (e.g., Fe, Cr) may result from stainless steel interfusion during the cell manufacturing process. For example, very fine metal particles (having an average particle size of about 1 μm to about 20 μm) ingress during manufacturing into the battery environment. These dissolve fairly readily in an acidified electrolyte system 30 and a localized stream of transition metal ions can move under the influence of the internal electric field to the negative electrode 22.

Dissolved transition metals ions, like $Fe^{x+}$ (x=2,3), can thus migrate towards negative electrode 22 and facilitate formation of coatings or alternatively dendrite formation. The transition metal ion can poison the solid-electrolyte interface (SEI) formed on the negative electrode 22, whereby the contaminated SEI then loses its passivating properties. Thereafter malignant SEI growth and consequently premature capacity loss is unavoidable. The loss of electroactive lithium ions ($Li^+$) decreases the available energy in the cell and promotes the growth of thicker and ionically resistive surface films on surfaces of the negative electrode 22, which both impair the power performance of the cell 20 and lead to an under-utilization of cell capacity due to an increased cell resistance. The dissolved transition metal ion may be transferred via the electrolyte 30 to the negative electrode 22, where it can catalyze parasitic reactions after deposition on the negative electrode 22. Also, dendrites having a pointed or protruding shape that can potentially penetrate and puncture through the separator 26 may form from transition metals migrating towards the negative electrode 22, which can potentially cause an internal short circuit.

As noted above, the electrolyte system 30 according to the present disclosure includes one or more lithium salts, one or more solvents, and at least one additive compound. The additive compound(s) is desirably soluble in the one or more solvents of the electrolyte. The additive compound is capable of complexing with an ion of a transition metal selected from the group consisting of: iron (Fe), manganese (Mn), cobalt (Co), nickel (Ni), chromium (Cr), and combinations thereof. In alternative aspects, the ion of a transition metal may be that of copper (Cu), tin (Sn), zinc (Zn), and the like. The transition metal ion may be present as a contaminant within the electrochemical cell. In certain variations, the transition metal may be iron, so that the transition metal ion trapping group is capable of complexing with an iron cation. After trapping the transition metal ion, the additive compound of the electrolyte system may then bind to a surface of the microporous separator 26 by van der Waal's forces. In this manner, the present disclosure contemplates "free-flowing" traps that can associate with the separator 26, which can slow down the migration of the TM ions towards negative electrodes.

The at least one additive is a compound that is non-polymeric. The compounds including an alkyl chain are not polymeric or cross-linked, which permits their dissolution in the electrolyte solution. The at least one additive includes an alkyl group and a transition metal ion trapping group. In various exemplary instances, the one or more additive compounds may have a structure represented by one of R—X and R—X—R, wherein R is an alkyl group and X is the transition metal ion trapping group. The alkyl group ($C_nH_{2n-1}$) may have greater than or equal to 4 carbon atoms to less than or equal to 22 carbon atoms and in certain variations, optionally greater than or equal to 4 carbon atoms to less than or equal to 12 carbon atoms. In certain variations, the alkyl group is selected from the group consisting of: butyl, pentyl, hexyl, heptyl, octyl, nonyl, decyl, undecyl, dodecyl, tridecyl, pentadecyl, hexadecyl, octadecyl, eicosanyl, and docosanyl. In various instances, the alkyl group may be selected from the group consisting of: butyl, pentyl, hexyl, heptyl, octyl, nonyl, decyl, undecyl, dodecyl, tridecyl, pentadecyl, hexadecyl, octadecyl, eicosanyl, and docosanyl.

In certain variations, the transition metal ion trapping group may be selected from the group consisting of: crown ethers, azacrown ethers, thiacrown ethers, siderophores, alkali metal salts of bidentate organic acids, alkali metal salts of ethylene diamine tetraacetic acid, and combinations thereof.

A crown ether is a cyclic ether in which the ether ring includes oxygen atoms that can complex with a transition metal cation. In many examples, the cyclic ether is a macrocycle. Some or all of the oxygen atoms in the ether ring may be exchanged for nitrogen atoms, a class of crown ethers known as azacrowns, or sulfur atoms, a class of crown ethers known as thiacrowns. The crown ether may be monocyclic, in which the crown ether forms a somewhat two-dimensional ring for complexing with a transition metal cation, or polycyclic, in which the crown ether forms a more three-dimensional cage for complexing with a metal cation. One example of a polycyclic crown ether is a cryptand (such as, cryptand [2.2.2], cryptand [2.2.1], and cryptand [2.1.1]; the "[$N_1.N_2.N_3$]" notation is a short-hand proposed by Jean-Marie Lehn). One or more oxygen atoms in the cryptand or other crown ether may also be substituted at any location along its polyether ring by any of a variety of atoms or functional groups known to those skilled in the art. For example, the cryptand may include sulfur substituted at one or more oxygen sites, or may include nitrogen substituted at one or more oxygen sites.

Suitable crown ethers may be those having structures where the size of the cavity defined by the crown structure has a diameter that is close to the size of the ion (e.g., the transition metal cation) to be trapped. For example, an ionic radius of $Fe^{3+}$ is about 64.5 pm, while an ionic radius of $Fe^{2+}$ is about 78 pm. Secondly, crown ethers having a permanent dipole moment and possess a maximum charge for any given separation between positive and negative charges of the structure, may be advantageous for use in the examples of the lithium cells described herein. For instance, a transition metal ion trapping group possessing a permanent dipole moment (such as crown ethers having an odd number of oxygen atoms in its polyether ring (e.g., 9-crown-3,15-crown-5, etc.), and further have thia- (i.e., sulfur) or aza- (i.e., nitrogen) substitutions that tend to break the symmetry of the charge distribution of a symmetric crown ether (such as 12-crown-4 or 18-crown-6) or an increase in the charge separation in an asymmetric trapping group) will align counter-parallel to an externally applied electric field to minimize its potential energy in the applied field. This can effectively maximize the ion trapping ability of the crown ether.

A lariat ether is a crown ether that includes a donor-group-bearing side-arm that provides additional metal cation binding sites beyond those present on the polyether ring. A calixarene is a metacyclophane of methylene-bridged phenol units, and is generally found in one of a cone, partial cone, 1,2-alternate, or 1,3-alternate conformation. A calix-crown is a calixarene that includes a polyether ring that links two phenolic oxygens of the calixarene framework. The indifference these groups show towards complexing with lithium ions is likely ascribed to their relatively large polyether ring or cage structures and/or the spatial orientation of their functional donor-group-bearing arms when compared to the relatively small size of lithium ions. Analogs and structurally related molecules of the transition metal ion trapping group just mentioned may also be employed.

A list of transition metal ion trapping groups that may be used in the additive and to which the alkyl groups may be attached include:

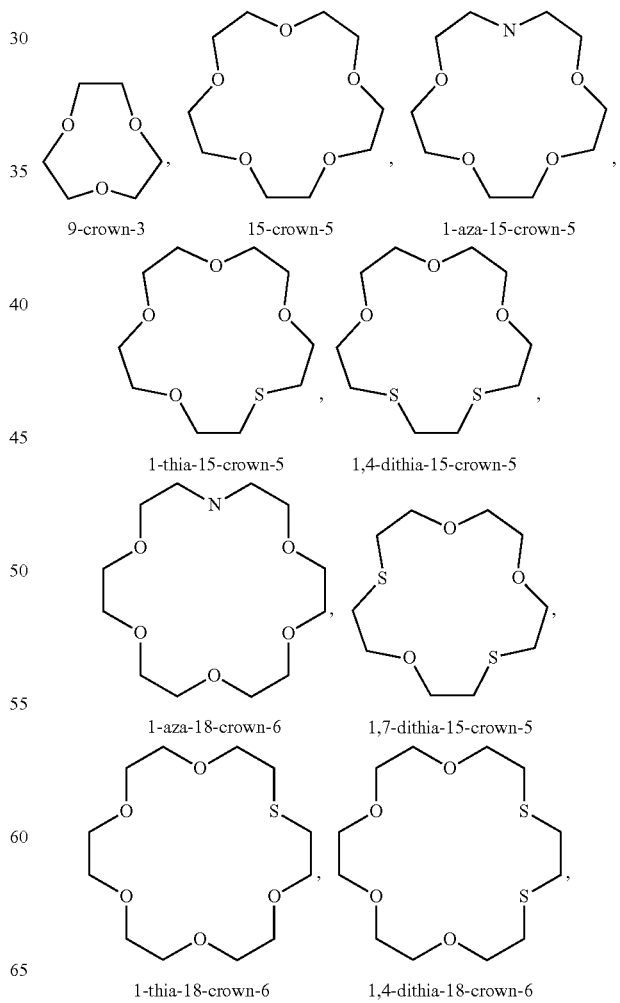

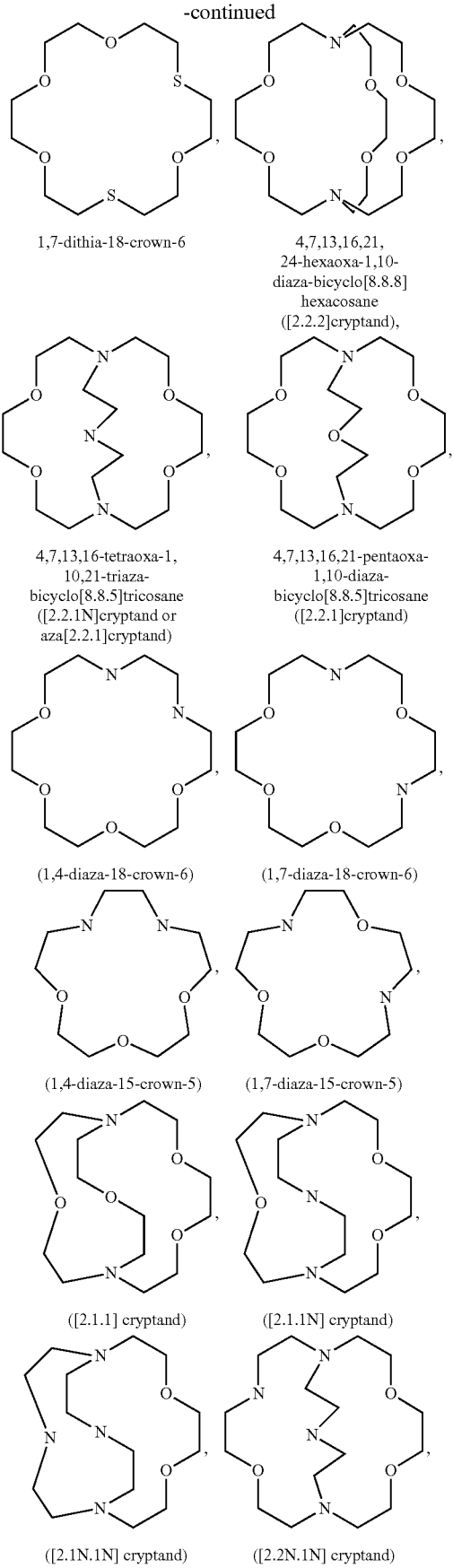

1,7-dithia-18-crown-6

4,7,13,16,21,24-hexaoxa-1,10-diaza-bicyclo[8.8.8]hexacosane ([2.2.2]cryptand), 4,7,13,16-tetraoxa-1,10,21-triaza-bicyclo[8.8.5]tricosane ([2.2.1N]cryptand or aza[2.2.1]cryptand)

4,7,13,16,21-pentaoxa-1,10-diaza-bicyclo[8.8.5]tricosane ([2.2.1]cryptand)

(1,4-diaza-18-crown-6)

(1,7-diaza-18-crown-6)

(1,4-diaza-15-crown-5)

(1,7-diaza-15-crown-5)

([2.1.1] cryptand)

([2.1.1N] cryptand)

([2.1N.1N] cryptand)

([2.2N.1N] cryptand)

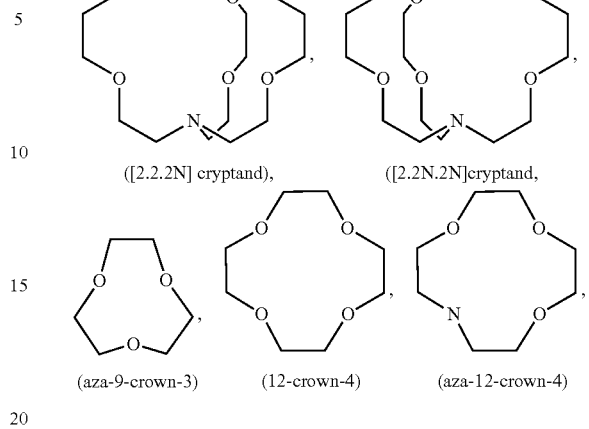

([2.2.2N] cryptand), ([2.2N.2N]cryptand, (aza-9-crown-3)

(12-crown-4)

(aza-12-crown-4)

and combinations thereof. Any hydrogen atoms in these structures are assumed.

Further, although not cyclic, in an example of the present disclosure, the transition metal ion trapping group may be a podand. A podand is an acyclic polyether ligand that includes donor-group-bearing arms that can complex with a metal cation.

In certain variations, the transition metal ion trapping group may include at least one siderophore. Certain siderophores may preferentially form stable, hexadentate, octahedral complexes with cations like $Fe^{3+}$. Highly effective siderophores may have three bidentate ligands per molecule forming a hexadentate complex with the iron cation. Typically siderophores are classified by the ligands used to chelate the iron ions. The siderophore may include a ligand (or be a derivative of a ligand) selected the group consisting of:

a catecholate comprising a phenolate $C_6H_5(OH)$-group generally represented by the structure

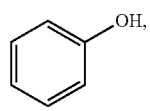

a hydroxamate comprising a $N(OH)C(=O)C$-group generally represented by the structure

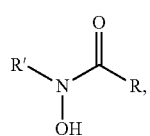

a carboxylate comprising a $H_3C(OH)C(=O)$-group represented by the structure

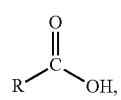

or a mixed ligand. For example, the catecholate siderophores may be selected from the group consisting of: enterobactin, bacillibactin, vibriobactin, and combinations thereof. The hydroxamate siderophores may be selected from the group consisting of: ferrichrome, desferrioxamine, desferrioxamine B, desferrioxamine E, fusarinine C, ornibactin, rhodotorulic acid, and combinations thereof. In certain variations, the carboxylate siderophores may be derivatives of citric acid. The mixed ligand siderophores are optionally selected from the group consisting of: azotobactin, pyoverdine, and combinations thereof.

In certain variations, the transition metal ion trapping group is a bactin siderophore. Bactins are generated by microbes to capture iron cations. In certain variations, the bactin siderophore may be selected from the representative group consisting of: ferrichrome, desferriozamine, desferrioxamine B, desferrioxamine E, fusarinine C, ornibactin, rhodotorulic acid, enterobactin, amphienterobactin, bacillibactin, bicriobactin, azotobactin, pyoverdine, agrobactin, aerobactin, yersiniabactin, salmochelin, rhizobactin, vibriobactin, azotobactin, pyoverdine, and combinations thereof.

In certain other variations, the transition metal ion trapping group may be alkali metal salts of bidentate organic acids, such as di-lithium salt of maleic acid represented by the structure

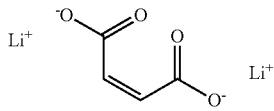

or di-lithium salt of iminodiacetic acid represented by the structure

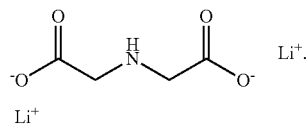

In other variations, the transition metal ion trapping group may be alkali metal salts of ethylene diamine tetraacetic acid (EDTA) represented by the structure

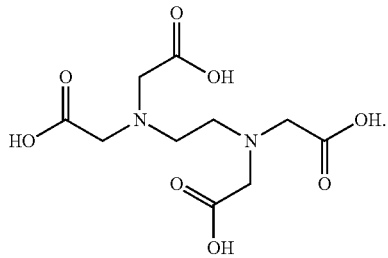 [SMILES: O=C(O)CN(CCN(CC(=O)O)CC(=O)O)CC(=O)O]

Derivatives of such trapping groups are also contemplated.

In other variations, the transition metal ion trapping group is selected from the group consisting of: 1,7-dialkyldiaza-12-crown-4,1,4,10-trioxa-7,10-dialkyl-7,10-diazacyclopentadecane, 1,4,10,13-tetraoxa-7,16-dialkyl-7,16-diazacyclooctadecane, dialkyl-7,16-dibenzyl-1,4,10,13-tetra-7,16-diazacyclooctadecane, 3,11-dialkyl-3,11-diaza-1,5,9,13-tetrathiacyclohexadecane, 3,11,19-trialkyl-3,11,19-triaza-1,5,9,13,17,21-hexathiacyclotetracosane, 1,4,7-trialkyl-1,4,7-triazacyclononane, 1,5,9-trialkyl-1,5,9-triazacyclododecane, tetraalkylcyclen, 1,4,8,11-tetraalkyl-1,4,8,11-tetraazacyclotetradecane, 1,4,7,10,13,16-hexaalkyl-1,4,7,10,13,16-hexaazacyclootadecane, poly(N-alkylethyleneimine), dialkyldibenzo-18-crown-6, N,N'-dialkyl-dibenzyl-1,4,10,13-tetraoxa-7,16-diazacyclooctadecane, 5,6,13,14-dibenzo-hexaoxa-1,10-diazabicyclo-(8,8,8)hexacosane, and combinations thereof.

After contact of the electrolyte system, including the one or more additives, with the microporous separator, the one or more additive compounds associate with a surface of the microporous separator via van der Waal's interactive forces, so that they grip to the surface. The relatively long alkyl pendant chain portion of the additive compound can strongly interact with the surface of the pore walls of the separator. In a system including microporous separators having pores small enough to force an interaction between the pendant chains of the additive compounds and the pore walls of the separator, the additive compounds (or complex with the additive compound and the trapped transition metal) may associate with the wall of the separator via van der Waals interactions. For example, the potentials for the Coulomb (electrostatic) and van der Waals interactions depend on distance as $1/r$ and $1/r^6$ (where r is the distance between centers of two charges), respectively. Therefore, at interatomic distances, the van der Waals forces can overcome the Coulomb interactions and cause the additive compound to associate with and stick to the pore walls of the separator. This is especially true when the separator includes a ceramic material.

In certain aspects, the microporous separator includes a ceramic material. In certain other aspects, the microporous separator has an average pore diameter of greater than or equal to 5 nm and less than or equal to 200 nm, optionally greater than or equal to 10 nm and less than or equal to 50 nm, optionally greater than or equal to 10 nm and less than or equal to 30 nm, and in certain aspects greater than or equal to 15 nm and less than or equal to 20 nm. In one variation, the microporous separator includes a ceramic coating and has an average pore size diameter of about 16 nm to about 18 nm. Such a separator is commercially available as the HTDS1604 nanoporous separator from Entek formed of ultrahigh molecular weight polyethylene and coated with alumina ceramic on each side.

Thus, the "gripper" additive is coupled or anchored to a surface of the microporous separator and can complex with a transition metal cation (e.g., iron (Fe), manganese (Mn), cobalt (Co), nickel (Ni), chromium (Cr)) present in the electrolyte of the electrochemical cell. Transition metal cations complex with the additive compound(s) that are in turn associated with the separator surface via van der Waals interactive forces and are prevented from further migrating around the electrochemical cell, for example, into the negative electrode. The lower the number of free transition metal ions (such as Fe ions), the lower the probability for contamination of negative electrode and loss of electrochemical cell performance.

The reach or trapping ability of the at least one additive compound may be related to a chain length of the alkyl group in the additive compound. For example, additive compounds may be selected to have relatively longer alkyl chain groups when used in an electrochemical cell having separators 26 with larger pores, relative to the diameter of the transition metal ion. In this manner, the at least one additive compound is associated with the separator and tethers or sequesters the transition metal ion preventing or limiting the movement of the transition metal ion to or towards the negative electrode 22. Thus, the at least one additive compound maintains the metal ions generated from contaminants in situ (e.g., within the separator 26) preventing or minimizing accumulation on or at the negative electrode 22.

With renewed reference to the electrolyte system in which the additive(s) are present, the electrolyte system also includes one or more lithium salts. The one or more lithium salts may be selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis-(oxalate)borate ($LiB(C_2O_4)_2$) (LiBOB); lithium hexafluoroarsenate ($LiAsF_6$); lithium trifluoromethanesulfonate ($LiCF_3SO_3$); bis(trifluoromethanesulfonimide) ($LiN(CF_3SO_2)_2$); lithium bis(fluorosulfonylimide) ($LiN(FSO_2)_2$); and combinations thereof. The present technology is particularly suitable for use with an electrolyte that includes $LiPF_6$ salt.

The one or more lithium salts and at least one additive compound may be dissolved in a variety of organic solvents, including but not limited to various alkyl carbonates, such as cyclic carbonates (e.g., ethylene carbonate (EC), propylene carbonate (PC), butylene carbonate (BC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), and combinations thereof.

In certain instances, the at least one additive compound may have a solubility within the electrolyte system 30 that is greater than or equal to about 0.01 grams per 100 grams of the electrolyte system 30. The electrolyte system 30 may cumulatively include greater than or equal to 0.01 weight percent to less than or equal to about 5 weight percent of the one or more additive compounds, and optionally greater than or equal to 0.05 weight percent to less than or equal to about 2 weight percent of the one or more additive compounds.

In certain other variations, methods of suppressing or minimizing the consequences of transition metal dissolution formation and improving cycling performance and capacity retention in an electrochemical cell that cycles lithium ions are contemplated. For example, the method may include introducing an electrolyte system into the electrochemical cell comprising an electrode and a microporous separator. The electrolyte system includes at least one lithium salt, at least one solvent, and at least one additive compound soluble in the solvent and having an alkyl group having greater than or equal to 4 carbon atoms and less than or equal to 22 carbon atoms and a transition metal ion trapping group consisting of: crown ethers, azacrown ethers, thiacrown eithers, siderophores, alkali metal salts of bidentate organic acids, alkali metal salts of ethylene diamine tetraacetic acid, and combinations thereof. After the introducing the at least one additive compound of the electrolyte system binds to a surface of the microporous separator by van der Waal's interactive forces. The transition metal ion trapping group of the additive compound complexes with a transition metal ion within the electrochemical cell selected from the group consisting of: iron (Fe), manganese (Mn), cobalt (Co), nickel (Ni), chromium (Cr), and combinations thereof. After trapping the transition metal ion, the additive compound of the electrolyte system may then bind to a surface of the microporous separator by van der Waal's forces. The consequences of the transition metal ion dissolution (e.g., from the positive electrode) for the performance (durability and power capability) of a Li-ion battery is thus minimized or suppressed. Any of the additive compounds and other components described above, including any combinations of these additive compounds or components, may be used in such a method.

In various aspects, the present disclosure provides more robust cell manufacturing by reducing susceptibility to impurities, especially iron-containing materials. Electrochemical cells having an electrolyte system including at least one additive compound soluble in the electrolyte solvent with an alkyl group having 4 to 22 carbon atoms and a transition metal ion trapping group consisting of: crown ethers, azacrown ethers, thiacrown ethers, siderophores, alkali metal salts of bidentate organic acids, alkali metal salts of ethylene diamine tetraacetic acid, and combinations thereof. The additive compound associates with a surface of the microporous separator via van der Waal's forces and complex with transition metal cations to minimize or suppress deposition of transition metal cations on the negative electrode. In this manner, the present disclosure provides methods of protecting a lithium ion electrochemical cell from the consequence of transition metal dissolution from positive electrodes and improve its overall performance durability (cycle and calendar life, as well as power capability).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical cell that cycles lithium ions having improved capacity retention comprising:

a positive electrode comprising a positive lithium-based electroactive material;

a negative electrode comprising a negative electroactive material;

a microporous separator disposed therebetween; and an electrolyte system comprising at least one lithium salt, at least one solvent, and at least one additive compound soluble in the solvent and comprising an alkyl group having greater than or equal to 4 carbon atoms to less than or equal to 22 carbon atoms and a transition metal ion trapping group comprising at least one siderophore selected the group consisting of: a catecholate comprising a phenolate $C_6H_5(OH)$-group, a hydroxamate comprising a N(OH)C(=O)C-group, a carboxylate comprising a $H_3C(OH)C(=O)$-group, and a mixed ligand, wherein the electrolyte system contacts the microporous separator and the at least one additive compound associates with a surface of the microporous separator via van der Waal's interactive forces and is capable of complexing with a transition metal cation present in the electrochemical cell selected from the group consisting of: iron (Fe), manganese (Mn), cobalt (Co), nickel (Ni), chromium (Cr), and combinations thereof, to minimize or suppress deposition of transition metal cations on the negative electrode.

2. The electrochemical cell of claim 1, wherein the electrolyte system comprises greater than or equal to about 0.01 weight % to less than or equal to about 5 weight % of the at least one additive compound.

3. The electrochemical cell of claim 1, wherein the at least one lithium salt is selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis-(oxalate)borate ($LiB(C_2O_4)_2$) (LiBOB); lithium hexafluoroarsenate ($LiAsF_6$); lithium trifluoromethanesulfonate ($LiCF_3SO_3$); bis(trifluoromethanesulfonimide) ($LiN(CF_3SO_2)_2$); lithium bis(fluorosulfonylimide) ($LiN(FSO_2)_2$); and combinations thereof; and
the at least one solvent is selected from the group consisting of: cyclic carbonates, linear carbonates, aliphatic carboxylic esters, γ-lactones, chain structure ethers, cyclic ethers, and combinations thereof.

4. The electrochemical cell of claim 1, wherein the at least one additive compound has a structure represented by one of R—X or R—X—R, where R represents the alkyl group having greater than or equal to 4 carbon atoms to less than or equal to 22 carbon atoms and X represents the transition metal ion trapping group.

5. The electrochemical cell of claim 1, wherein the alkyl group is selected from the group consisting of: butyl, pentyl, hexyl, heptyl, octyl, nonyl, decyl, undecyl, dodecyl, tridecyl, pentadecyl, hexadecyl, octadecyl, eicosanyl, and docosanyl.

6. The electrochemical cell of claim 1, wherein the hydroxamate siderophores are selected from the group consisting of: ferrichrome, desferrioxamine, desferrioxamine B, desferrioxamine E, fusarinine C, ornibactin, rhodotorulic acid, and combinations thereof;
the catecholate siderophores are selected from the group consisting of: enterobactin, bacillibactin, vibriobactin, and combinations thereof;
the carboxylate siderophores are derivatives of citric acid; and
the mixed ligands siderophores are selected from the group consisting of: azotobactin, pyoverdine, and combinations thereof.

7. The electrochemical cell of claim 1, wherein the transition metal ion trapping group further comprises one or more crown ethers, azacrown ethers, thiacrown ethers, alkali metal salts of bidentate organic acids, alkali metal salts of ethylene diamine tetraacetic acid, and combinations thereof.

8. The electrochemical cell of claim 1, wherein the transition metal ion trapping group further comprises a bactin siderophore selected from the group consisting of: ferrichrome, desferriozamine, desferrioxamine B, desferrioxamine E, fusarinine C, ornibactin, rhodotorulic acid, enterobactin, bacillibactin, bicriobactin, azotobactin, pyoverdine, agrobactin, aerobactin, yersiniabactin, salmochelin, rhizobactin, vibriobactin, azotobactin, pyoverdine, and combinations thereof.

9. The electrochemical cell of claim 1, wherein the transition metal ion trapping group further comprises one or more of 1,7-dialkyldiaza-12-crown-4, 1,4,10-trioxa-7,10-dialkyl-7,10-diazacyclopentadecane, 1,4,10,13-tetraoxa-7,16-dialkyl-7,16-diazacyclooctadecane, dialkyl-7,16-dibenzyl-1,4,10,13-tetra-7,16-diazacyclooctadecane, 3,11-dialkyl-3,11-diaza-1,5,9,13-tetrathiacyclohexadecane, 3,11,19-trialkyl-3,11,19-triaza-1,5,9,13,17,21-hexathiacyclotetracosane, 1,4,7-trialkyl-1,4,7-triazacyclononane, 1,5,9-trialkyl-1,5,9-triazacyclododecane, tetraalkylcyclen, 1,4,8,11-tetraalkyl-1,4,8,11-tetraazacyclotetradecane, 1,4,7,10,13,16-hexaalkyl-1,4,7,10,13,16-hexaazacyclootadecane, poly(N-alkylethyleneimine), dialkyldibenzo-18-crown-6, N,N'-dialkyl-dibenzyl-1,4,10,13-tetraoxa-7,16-diazacyclooctadecane, 5,6,13,14-dibenzo-hexaoxa-1,10-diazabicyclo-(8,8,8)hexacosane, and combinations thereof.

10. An electrochemical cell that cycles lithium ions having improved capacity retention comprising:
a positive electrode comprising a positive lithium-based electroactive material;
a negative electrode comprising a negative electroactive material;
a microporous separator, comprising a ceramic material having pore diameters greater than or equal to 5 nm and less than or equal to 200 nm, disposed therebetween; and
an electrolyte system comprising at least one lithium salt, at least one solvent, and at least one non-polymeric additive compound soluble in the at least one solvent and comprising an alkyl group having greater than or equal to 4 carbon atoms to less than or equal to 22 carbon atoms and an iron cation trapping group comprising a bactin siderophore selected from the group consisting of: ferrichrome, desferriozamine, desferrioxamine B, desferrioxamine E, fusarinine C, ornibactin, rhodotorulic acid, enterobactin, bacillibactin, bicriobactin, azotobactin, pyoverdine, agrobactin, aerobactin, yersiniabactin, salmochelin, rhizobactin, vibriobactin, azotobactin, pyoverdine, and combinations thereof, wherein the electrolyte system contacts the microporous separator and the at least one non-polymeric additive compound associates with a surface of the microporous separator via van der Waal's interactive forces and is capable of complexing with iron cations to minimize or suppress deposition of the iron cations on the negative electrode.

11. The electrochemical cell of claim 10, wherein the electrolyte system comprises greater than or equal to about 0.01 weight % to less than or equal to about 5 weight % of the at least one non-polymeric additive compound, the at least one lithium salt is selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis-(oxalate)borate ($LiB(C_2O_4)_2$) (LiBOB); lithium hexafluoroarsenate ($LiAsF_6$); lithium trifluoromethanesulfonate ($LiCF_3SO_3$); bis(trifluoromethanesulfonimide) ($LiN(CF_3SO_2)_2$); lithium bis(fluorosulfonylimide) ($LiN(FSO_2)_2$); and combinations thereof; and
the at least one solvent is selected from the group consisting of: cyclic carbonates, linear carbonates, aliphatic carboxylic esters, γ-lactones, chain structure ethers, cyclic ethers, and combinations thereof.

12. The electrochemical cell of claim 10, wherein the at least one non-polymeric additive compound has a structure represented by one of R—X or R—X—R, where R is the alkyl group having greater than or equal to 4 carbon atoms and less than or equal to 22 carbon atoms and X is the iron cation trapping group, and
wherein the alkyl group is selected from the group consisting of: butyl, pentyl, hexyl, heptyl, octyl, nonyl, decyl, undecyl, dodecyl, tridecyl, pentadecyl, hexadecyl, octadecyl, eicosanyl, and docosanyl.

13. The electrochemical cell of claim 10, wherein the iron cation trapping group further comprises one or more crown ethers, azacrown ethers, thiacrown ethers, alkali metal salts of bidentate organic acids, alkali metal salts of ethylene diamine tetraacetic acid, and combinations thereof.

14. The electrochemical cell of claim 10, wherein the iron cation trapping group further comprises one or more of a catecholate comprising a phenolate $C_6H_5(OH)$-group, a hydroxamate comprising a $N(OH)C(=O)C$-group, a carboxylate comprising a $H_3C(OH)C(=O)$-group, and a mixed ligand.

15. The electrochemical cell of claim 10, wherein the iron cation trapping group further comprises one or more of 1,7-dialkyldiaza-12-crown-4,1,4,10-trioxa-7,10-dialkyl-7,10-diazacyclopentadecane, 1,4,10,13-tetraoxa-7,16-dialkyl-7,16-diazacyclooctadecane, dialkyl-7,16-dibenzyl-1,4,10,13-tetra-7,16-diazacyclooctadecane, 3,11-dialkyl-3,11-diaza-1,5,9,13-tetrathiacyclohexadecane, 3,11,19-trialkyl-3,11,19-triaza-1,5,9,13,17,21-hexathiacyclotetracosane, 1,4,7-trialkyl-1,4,7-triazacyclononane, 1,5,9-trialkyl-1,5,9-triazacyclododecane, tetraalkylcyclen, 1,4,8,11-tetraalkyl-1,4,8,11-tetraazacyclotetradecane, 1,4,7,10,13,16-hexaalkyl-1,4,7,10,13,16-hexaazacyclooctadecane, poly(N-alkylethyleneimine), dialkyldibenzo-18-crown-6, N,N'-dialkyl-dibenzyl -1,4,10,13-tetraoxa-7,16-diazacyclooctadecane, 5,6,13,14-dibenzo-hexaoxa-1,10-diazabicyclo-(8,8,8)hexacosane, and combinations thereof.

16. An electrochemical cell that cycles lithium ions having improved capacity retention, the electrochemical cell comprising:
a positive electrode comprising a positive lithium-based electroactive material;
a negative electrode comprising a negative electroactive material;
an electrolyte system comprising at least one lithium salt, at least one solvent, and at least one non-polymeric additive compound soluble in the at least one solvent, wherein the non-polymeric compound comprises an alkyl group having greater than or equal to 4 carbon atoms to less than or equal to 22 carbon atoms and a transition metal ion trapping group consisting of: crown ethers, azacrown ethers, siderophores, alkali metal salts of bidentate organic acids, alkali metal salts of ethylene diamine tetraacetic acid, and combinations thereof, wherein the transition metal ion trapping group is capable of complexing with a transition metal cation present in the electrochemical cell, and wherein the transition metal cation is selected from the group consisting of: iron (Fe), manganese (Mn), cobalt (Co), nickel (Ni), chromium (Cr), and combinations thereof; and
a microporous separator disposed between the positive electrode and the negative electrode and comprising a plurality of pores having pore diameters greater than or equal to 5 nm and less than or equal to 200 nm, wherein the alkyl group of the non-polymeric compound associates with a pore wall of at least a portion of the plurality of pores of the microporous separator so that the non-polymeric compound sequesters the transition metal cation with the transition metal ion trapping group.

17. The electrochemical cell of claim 16, wherein the electrolyte system comprises greater than or equal to about 0.01 weight % to less than or equal to about 5 weight % of the at least one non-polymeric additive compound,
wherein the at least one lithium salt is selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis-(oxalate)borate ($LiB(C_2O_4)_2$) (LiBOB); lithium hexafluoroarsenate ($LiAsF_6$); lithium trifluoromethanesulfonate ($Li\ CF_3SO_3$); bis(trifluoromethanesulfonimide) ($LiN(CF_3SO_2)_2$); lithium bis(fluorosulfonylimide) ($LiN(FSO_2)_2$); and combinations thereof; and
wherein the at least one solvent is selected from the group consisting of: cyclic carbonates, linear carbonates, aliphatic carboxylic esters, γ-lactones, chain structure ethers, cyclic ethers, and combinations thereof.

18. The electrochemical cell of claim 16, wherein the at least one non-polymeric additive compound has a structure represented by one of R—X or R—X13 R, where R is the alkyl group having greater than or equal to 4 carbon atoms and less than or equal to 22 carbon atoms and X is the transition metal ion trapping group, and
wherein the alkyl group is selected from the group consisting of: butyl, pentyl, hexyl, heptyl, octyl, nonyl, decyl, undecyl, dodecyl, tridecyl, pentadecyl, hexadecyl, octadecyl, eicosanyl, and docosanyl and X is a siderophore selected the group consisting of: a catecholate comprising a phenolate $C_6H_5(OH)$-group, a hydroxamate comprising a $N(OH)C(=O)C$-group, a carboxylate comprising a $H_3C(OH)C(=O)$-group, and a mixed ligand.

19. The electrochemical cell of claim 16, wherein the transition metal ion trapping group comprises a bactin siderophore selected from the group consisting of: ferrichrome, desferriozamine, desferrioxamine B, desferrioxamine E, fusarinine C, ornibactin, rhodotorulic acid, enterobactin, bacillibactin, bicriobactin, azotobactin, pyoverdine, agrobactin, aerobactin, yersiniabactin, salmochelin, rhizobactin, vibriobactin, azotobactin, pyoverdine, and combinations thereof.

20. The electrochemical cell of claim 16, wherein the transition metal ion trapping group is selected from the group consisting of: 1,7-dialkyldiaza-12-crown-4, 1,4,10-trioxa-7, 10-dialkyl-7, 10-diazacyclopentadecane, 1,4,10,13-tetraoxa-7, 16-dialkyl-7, 16-diazacyclooctadecane, dialkyl-7,16-dibenzyl-1,4,10,13-tetra-7, 16-diazacyclooctadecane, 3,11-dialkyl-3,11-diaza-1,5,9,13-tetrathiacyclohexadecane, 3,11,19-trialkyl-3, 11,19-triaza-1,5,9,13,17,21-hexathiacyclotetracosane, 1,4,7-trialkyl-1,4,7-tri azacyclononane, 1,5,9-trialkyl-1,5,9-triazacyclododecane, tetraalkylcyclen, 1,4,8,11-tetraalkyl-1,4,8,11-tetraazacyclotetradecane, 1,4,7,10,13,16-hexaalkyl-1,4,7,10,13,16-hexaazacyclooctadecane, poly(N-alkylethyleneimine), dialkyldibenzo-18-crown-6, N,N'-dialkyl-dibenzyl-1,4,10,13-tetraoxa-7,16-diazacyclooctadecane, 5,6,13,14-dibenzo-hexaoxa-1,10-diazabicyclo-(8,8,8)hexacosane, and combinations thereof.

* * * * *